(12) United States Patent
Weimer et al.

(10) Patent No.: US 12,042,819 B1
(45) Date of Patent: Jul. 23, 2024

(54) SYSTEMS AND METHODS FOR FORMING UNIFORM MONOLAYERS OF NANOPARTICLES

(71) Applicant: Board of Trustees of the University of Alabama, for and on behalf of the University of Alabama in Huntsville, Huntsville, AL (US)

(72) Inventors: Jeffrey J. Weimer, Huntsville, AL (US); Jimmie L. Mitchell, Madison, AL (US)

(73) Assignee: Board of Trustees of the University of Alabama for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 18/328,194

(22) Filed: Jun. 2, 2023

Related U.S. Application Data (62) Division of application No. 17/225,040, filed on Apr. 7, 2021, now Pat. No. 11,701,685.

(60) Provisional application No. 63/047,869, filed on Jul. 2, 2020.

(51) Int. Cl.
| | |
|---|---|
| *B05D 7/24* | (2006.01) |
| *B05D 1/20* | (2006.01) |
| *C09D 5/22* | (2006.01) |
| *C09K 11/08* | (2006.01) |

(52) U.S. Cl.
CPC .............. *B05D 1/204* (2013.01); *B05D 7/24* (2013.01); *C09D 5/22* (2013.01); *C09K 11/08* (2013.01)

(58) Field of Classification Search
CPC .................................. B05D 1/204; B05D 7/24
See application file for complete search history.

(56) References Cited

U.S. PATENT DOCUMENTS 9,096,425 B2    8/2015  Coe-Sullivan

OTHER PUBLICATIONS

Guo et al. (NPL title: Self-Assembled Large-Scale Monolayer of Au Nanoparticles at the Air/Water Interface Used as a SERS Substrate, published on Apr. 21, 2016 (Year: 2016).*
Guo et al. (NPL title: Supporting information of Self-Assembled Large-Scale Monolayer of Au Nanoparticles at Air/Water Interface Used as a SERS Substrate. (Year: 2016).*

(Continued)

*Primary Examiner* — Hai Y Zhang
(74) *Attorney, Agent, or Firm* — Butler Snow LLP; Jon E. Holland (57) ABSTRACT

The present disclosure is directed to methods for preparing nanoparticle monolayers on a sub-phase by controlling the spreading rate of the nanoparticles. The nanoparticles are first prepared in a nanoparticle solution at a predetermined concentration with a solvent. The sub-phase solution is prepared to have a density and viscosity compatible with the desired spreading rate. Additives, such as glycerol, are used to alter the density of the sub-phase solution. A volume of nanoparticle solution is deposited on the surface of the sub-phase solution and allowed to spread in a controlled manner on the unconstrained surface, forming a uniform nanoparticle monolayer. A substrate is then placed in contact with the nanoparticle monolayer to form a uniform nanoparticle coating on the surface of the substrate.

11 Claims, 9 Drawing Sheets

(56) References Cited

OTHER PUBLICATIONS

Guo, et al., "Self-Assembled Large-Scale Monolayer of Au Nanoparticles at the Air-Water Interface Used as a SERS Substrate," ACS Publication, Langmuir 2016, Aug. 21, 2016, pp. 4530-4537, vol. 32.
Guo, et al., "Supporting Information of Self-Assembled Large-Scale Monolayer of Au Nanoparticles at the Air-Water Interface Used as a SERS Substrate," ACS Publication, Langmuir 2016, Aug. 21, 2016, pp. 4530-4537, vol. 32.
Hu, et al., "Oil-Water Interfacial Self-Assembly: A Novel Strategy for Nanofilm and Nanodevice Fabrication," Chem. Soc. Rev. 2012, pp. 1350-1362, vol. 41.
Cadmium Selenide, PubChem, 2005, pp. 1-27.
Vapour Pressure, Science Direct, 2014, pp. 1-12.

\* cited by examiner

SYSTEMS AND METHODS FOR FORMING UNIFORM MONOLAYERS OF NANOPARTICLES

RELATED APPLICATION

This application is a divisional of U.S. patent application Ser. No. 17/225,040 filed on Apr. 7, 2021, titled "Systems and Methods for Forming Uniform Monolayers of Nanoparticles," which claims the benefit of U.S. Provisional Patent Application No. 63/047,869 filed on Jul. 2, 2020, titled "Method to Control the Area Density of Solid Nanoparticles Deposited from Spreading Liquid Films," both of which applications are incorporated by reference herein in their entirety.

TECHNICAL FIELD

The present disclosure is directed to methods of preparing uniform nanoparticle films and coatings by controlling the spreading rate of a nanoparticle solution on a sub-phase solution.

RELATED ART

Coatings of nano-sized particles (hereafter called NPs) are used in a wide range of commercial applications. For instance, coating a substrate with a layer or layers of NPs can change wetting, optical-reflectivity, or chemical reactivity of the substrate from an undesired to a desired performance standard while retaining the structural integrity of the bulk substrate. In some applications, the goal is to arrange the NPs in one or more layers on a solid substrate for the greatest efficiency in the device. Quantum dots (QDs) are a specific class of NPs with characteristic opto-electronic properties, which are important, for example, for the conversion of light to electrical current. When used on solar cells or displays, a layer of QDs needs to be as thin and compact as possible to maximize the amount of energy absorbed and converted per unit area. The layer must also be uniform in thickness so that performance is consistent throughout the application. These characteristics not only increase performance efficiency, but also reduce component size, reduce cost, and facilitate utilization in portable and/or flexible products.

The ability to coat substrates with a layer or multilayers of NPs that are structurally well-ordered at nano-scale levels over ranges of macro-scale length is of particular interest in applications involving devices with surface properties that must be controlled at the nano- to micro-scale and maintained over large surface areas. Spin coating, dip coating, nanoimprint lithography, layer-by-layer assembly, electrospray deposition, photoresist contact pattering, spray coating, and ink jet printing methods have been used to produce films of NPs. However, these methods produce film layers with varying degrees of uniformity in thickness and packing density. None of these methods have been reported to produce a uniform, compact, monolayer film of NPs. They also have one or more disadvantages such as complex or expensive equipment, repetitive procedures, small coverage areas, excessive material waste, non-uniform coverage, or inconsistent thickness. In certain applications, non-uniformity of packing order at the nano-scale may have a profound impact on device or component performance because the defects in structural order are the same size as the required performance metric, while the lack of uniformity in the nano-scale ordering over the macro-scale can impede the ability to produce large surface area devices.

The Langmuir film method has demonstrated the ability to achieve a NP film of monolayer thickness at an air-water interface. The NPs are dispersed in a non-polar organic solvent, such as chloroform or toluene, and the liquid dispersion is deposited onto a polar immiscible sub-phase, such as water. The solvent spreads on the surface of the sub-phase, carrying the NPs with it. As the solvent evaporates, the NPs self-assemble on the surface to form a film. The objective is to create a uniform monolayer of NPs.

At low surface pressures, such as those that exist when the Langmuir film is deposited in an unconstrained system, numerous defects such as gaps, voids, aggregates, rings and/or islands exist, making the film less suitable for efficient and immediate transfer onto a solid substrate. Typically, the film is subsequently compressed in one or more steps at increasing surface pressures until the NPs are as closely packed as possible without collapsing into multilayers. One drawback to this process is that multiple compression cycles are required to achieve maximum film density per unit area of coating, reducing the efficiency of the process.

Eliminating these compressive steps opens a path to commercialize Langmuir deposition for monolayers of NP films with the potential for continuous, rather than batch operations. The rate of spreading is a determining factor in how uniformly the NPs are organized on the sub-phase prior to compression. Controlling the rate of spreading can decrease or eliminate the defects in the Langmuir film of NPs.

Whether the spreading system is a liquid-on-liquid sub-phase or a liquid-on-solid sub-phase, modifying the sub-phase properties, such as viscosity, surface tension, interfacial tension, solubility, concentration, density, volatility, temperature, and roughness can control the spreading rate, and subsequently, the NP dispersion and uniformity. The following methods control this spreading to create a Langmuir film of NPs, where the NPs form a well-structured monolayer across a large spatial region in an unconstrained system. NP monolayer formation is driven by forces that occur within and during the spreading phase of the Langmuir film. The resulting monolayer films are compatible with subsequent templating in accordance with Langmuir Blodgett or Langmuir Schaeffer techniques. The initial, high-quality Langmuir film of NPs has a single micro-structure throughout the entire macro-layer of the film and can be used directly to coat substrates with well-ordered coatings of NPs, including QDs.

SUMMARY OF THE DISCLOSURE

The present disclosure is directed to methods of preparing uniform nanoparticle monolayers on the surface of a sub-phase using controlled spreading rates of the nanoparticles. In one aspect of the disclosure, there is provided a method of preparing a nanoparticle monolayer. The method involves first providing a nanoparticle solution with nanoparticles in a solvent and providing a sub-phase solution with a sub-phase base and an additive. The sub-phase solution is contained within a vessel of a predetermined area and at a predetermined temperature. A volume of the nanoparticle solution is then deposited onto a top surface of the sub-phase solution, the volume of the nanoparticle solution being unconstrained by walls of the vessel. In this manner, the nanoparticles spread at a controlled spreading rate to form a uniform nanoparticle monolayer on the top surface of the sub-phase solution.

In some embodiments, the nanoparticles are quantum dots and have a radius ranging from 3 nanometers to 10 nanometers. In some embodiments, the sub-phase base is water and the additive is glycerol, where glycerol comprises 20 to 100 percent of the sub-phase solution by weight. In some embodiments, the method further involves contacting a substrate with the nanoparticle monolayer so that the substrate is coated with a uniform nanoparticle coating. In these instances, the substrate may be contacted with the nanoparticle monolayer using a Langmuir Blodgett technique or a Langmuir Schaefer technique.

In another aspect of the disclosure, there is provided a method preparing a uniform nanoparticle coating on a substrate. The method involves first providing a nanoparticle solution with an initial concentration of nanoparticles in a solvent. A sub-phase solution of a denser, immiscible liquid is contained within a vessel at a sub-phase temperature. Next, a volume of the nanoparticle solution is deposited onto a top surface of the sub-phase solution, the volume of the nanoparticle solution being unconstrained by walls of the vessel and spreading at a spreading rate, so that a nanoparticle film is formed. The nanoparticle film is then evaluated for non-uniform features and the film formation steps are repeated when non-uniform features are observed. Through repetition of the method steps with altered spreading parameters, the spreading rate is altered so that the nanoparticles form a uniform nanoparticle monolayer on the sub-phase solution. The substrate is then placed into contact with the nanoparticle monolayer so that the substrate is coated with a uniform nanoparticle coating.

In some embodiments, the nanoparticles are quantum dots. In some embodiments, the sub-phase solution includes a sub-phase aqueous base and an additive, where the additive may be glycerol. In some instances, glycerol comprises 20 to 100 percent of the sub-phase solution by weight. In some embodiments, the spreading rate is decreased by increasing the percent weight of the additive in the sub-phase solution, by increasing the sub-phase temperature, and/or by increasing the initial concentration of nanoparticles in the solvent. In some cases, the non-uniform features include agglomerates, discontinuities, or heterogeneous film thickness. In some embodiments, the substrate is contacted with the nanoparticle monolayer using a Langmuir Blodgett technique, while in other embodiments, the substrate is contacted with the nanoparticle monolayer using a Langmuir Schaefer technique.

A further understanding of the nature and advantages of the present invention will be realized by reference to the remaining portions of the specification and the drawings.

BRIEF DESCRIPTION OF DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure is generally directed to methods for creating uniform nanoparticle films for coating a substrate. The coated film comprises a monolayer or well-defined multilayers that have a homogenous structure and consistent thickness throughout. Specifically, the present methods involve preparing a uniform Langmuir film in an unconstrained sub-phase system by controlling the spreading rate of the nanoparticles across the surface of the sub-phase.

As used herein, the term "nanoparticle" refers to a particle with at least one dimension between one nanometer and about 100 nanometer. A nanoparticle (NP) may be carbon-based or composed of materials including metals, ceramics, semiconductors, polymers, or biological materials such as lipids. Examples of NPs include liposomes; fullerenes; carbon nanotubes; dendrimers; semiconductor quantum dots; gold, silver, iron, or platinum colloidal particles; and silica colloids. Spherical quantum dots (QDs) with a radius of 3-10 nanometers are used in the present method as exemplary NPs, though the exemplary method presented in this disclosure is compatible with other types, sizes, and shapes of NPs, which are thus contemplated for use herein.

As used herein, "uniform" refers to the organization and homogeneity of NP films or coatings at macro and micro-scales. At a macro-scale, a "uniform" NP film is substantially homogenous across a surface and comprises a NP layer of a defined, consistent thickness across the entire surface. Examples of non-uniform films or coatings at the macro-scale include those with patchy coverage, holes in the layer, or inconsistent thickness levels when viewed across the entire area of the film or coating. At a micro-scale, a "uniform" NP film is substantially homogenous relative to the dimensions of a NP, with substantially even spacing between NPs, consistent organization of NPs, and with a generally unfluctuating film thickness. Examples of non-uniform films and coatings at the micro-scale include those with instances of two dimensional grain boundaries in otherwise crystalline-like ordering, those with highly amorphous or fractal patterns in their nano-structure, or those having three-dimensional agglomerates rather than retaining a two dimensional monolayer when viewed across the range of how the structures in the film repeat themselves at the nano-scale.

As used herein, a "monolayer" is a layer that has a defined thickness of only one molecule of the material. A NP monolayer is correspondingly a layer of NPs with a consistent, homogenous thickness of only one NP. The term monolayer by itself will be used interchangeably to mean a NP monolayer.

As used herein, the term "unconstrained" refers to the use of a sub-phase top surface with an area larger than that of a desired NP monolayer film, so that a volume of NP solution deposited on the top surface is not forced required to contact a wall or walls of the vessel holding the sub-phase solution. While contact of the NP solution with a vessel wall may occur in some instances, any contact is not necessary for the formation of a NP monolayer on the top surface of the sub-phase.

The following methods offer efficient and easily-adapted means of controlling the uniformity and organization of the NP coatings at a macro and micro-scale. These methods integrate spreading rate control of Langmuir film formation with established Langmuir Blodgett (LB) and Langmuir Schaeffer (LS) coating techniques. A goal of the following methods is to provide an initial, uniform Langmuir film of NPs by controlling parameters such as the concentration of NPs in a solvent (solvent+NPs), the volume of NP solution to be dispersed across the surface of a sub-phase, the sub-phase solution temperature, and the additive content in the sub-phase solution.

Unlike previous methods to create well-ordered Langmuir films of NPs, the present methods do not require rounds of mechanical compression of the floating NPs at the surface of the sub-phase to form a NP monolayer film after the initial deposition of the Langmuir film. Instead, the spreading of the NP solution is controlled in an unconstrained system so that a Langmuir film is formed, "locking" the NPs into a monolayer as the NP solution spreads and the solvent evaporates. This monolayer Langmuir film of NPs can be generated to have a homogenous and uniform structure across its final deposited surface area, without patches or "islands" of NPs. Additionally, this monolayer Langmuir film is homogenous and uniform in thickness across its entire deposition area.

Following the formation of this uniform NP monolayer film on the surface of the sub-phase solution, a substrate may be placed in contact with the NP monolayer using LB or LS techniques. After coating, the substrate retains a uniform NP coating of a defined thickness. Multiple, homogenous layers of NPs may be coated on a substrate by subsequent contact events of the coated substrate with NP monolayers on the surface of a sub-phase.

In some embodiments of the present disclosure, a uniform NP monolayer film is formed on a sub-phase in an unconstrained system without having to add compression. In this regard, nanoparticles for forming the film are mixed with an evaporative solvent, and the solvent is then poured or otherwise deposited on the sub-phase, which may be a liquid or a solid that forms a substrate for the monolayer being formed. The volume of the solvent is selected so that the solvent completely covers the desired surface area of the sub-phase on which the monolayer is to be formed, and the concentration of the nanoparticles is selected so that a monolayer of the nanoparticles is capable of covering the surface of the sub-phase as desired.

This disclosure reveals that, for selections of concentrations of nanoparticle in a selected volume of liquid solvent+ nanoparticles deposited and spread on selections of a liquid sub-phase, when the combination or ratio of evaporation rate for the solvent and spreading rate for the solvent+nanoparticle film is properly controlled, a homogenous and uniform monolayer of nanoparticles will remain on the liquid sub-phase once the solvent sufficiently or completely evaporates. The solvent mixed with nanoparticles spreads over the surface of the sub-phase at a spreading rate depending on various factors, including the density and viscosity of the sub-phase as well as the interfacial tensions of the sub-phase and solvent. During the formation of the monolayer, the system (including the sub-phase and the solvent mixed with nanoparticles being poured or otherwise deposited on the sub-phase) may be placed in an environment (e.g., a chamber or container) for which the temperature and/or pressure/ composition of gases above the film can be selectively controlled in order to control the evaporation rate of the solvent. Notably, the combination or ratio of evaporation rate and spreading rate is controlled so that the nanoparticles spread evenly across the surface of the sub-phase while the solvent evaporates. Specifically, the desired spreading rate will depend on interfacial tensions, densities, and viscosities of the materials selected for the solvent and the sub-phase, while the desired evaporation rate will depend on the vapor pressure of the solvent, the temperature of the spreading film, and the partial pressure of the solvent in the gas phase above the film. Since the solvent has evaporated during formation of the monolayer, there is no need to perform steps to remove the solvent via other techniques or to perform other post-processing steps.

Figure 1:
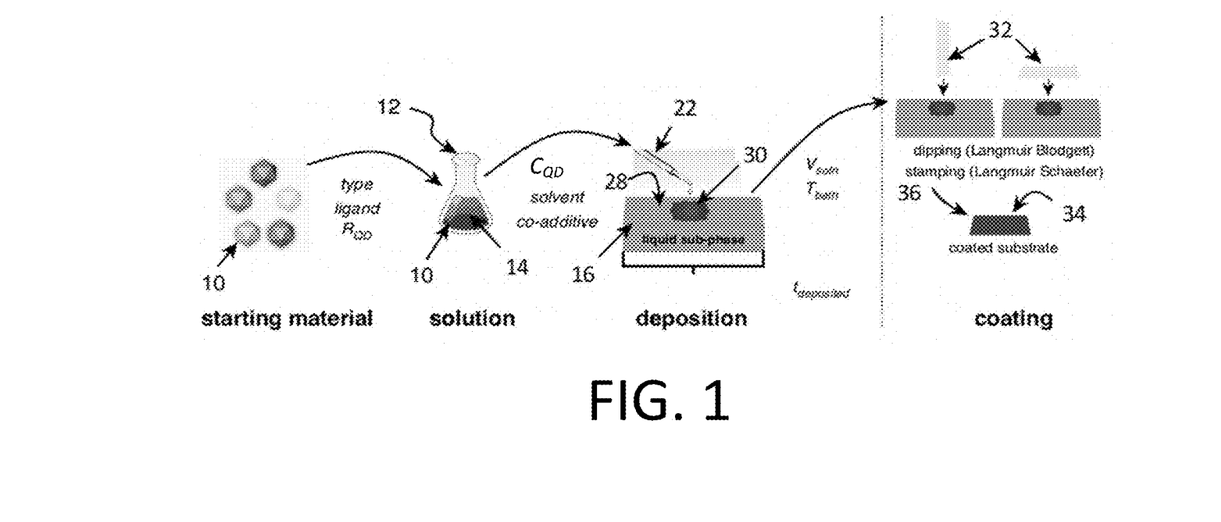
FIG. 1 is an illustration of the various factors involved in methods for preparing monolayer films of NPs on the surface of a sub-phase solution and the subsequent coating of a substrate to form a Langmuir-Schaefer or Langmuir-Blodgett film of the NPs.

FIG. 1 depicts the parameters that can be defined or controlled during any method, including exemplary methods, to create an initial uniform nanoparticle (NP) monolayer 30 on a sub-phase solution 16 and transfer the NP monolayer 30 to a substrate 32. The nanoparticle (NP) solution 12 may optionally further comprise one or more co-additives. Co-additives may optionally be included in the NP solution 12 to alter the desired properties of a resulting nanoparticle (NP) coating 34 or the spreading behavior of the NPs 10 during and after deposition as a Langmuir film.

NPs 10 may be of a predetermined material type or composition, with a predetermined shape such as a sphere, cube, or cylinder, with a radius ($R_{NP}$) or other characteristic size parameter, and with or without a ligand coating. In one embodiment, the NPs 10 of the method may be QDs. In this embodiment, the size (radius $R_{QD}$) and type or composition of the quantum dot determines its opto-electrical properties. The $R_{NP}$ may range from approximately 1 nm to approximately 100 nm in at least one dimension of the NPs 10. A ligand coating may comprise any material compatible with the intended solvent 14 of the NP solution 12, compatible with the intended sub-phase solution 16, compatible with the NP material, shape, and surface charge, and suitable for use in the intended application of the coated substrate 36. Typical ligand coatings for NPs 10 include carboxylates, phosphonates, thiolates, amines, phosphines, metal complexes, halide ions, chalcogenide ions, cationic counter ions, imidazoles, and pyridines. Ligand coatings may be homogenous or heterogeneous as desired and suitable for use in the intended application. In the instance where the NPs 10 are semi-conductor quantum dots, an organic ligand may be used to prevent oxidation and preserve the opto-electrical behavior imparted by the quantum dots. In a preferred embodiment, the NPs 10 are QDs with an $R_{QD}$ of approximately 3 nm to approximately 10 nm, or approximately 3 nm to approximately 4 nm. The material type or composition of the quantum dot may be varied to alter the opto-electrical properties.

In some embodiments, one type of NP 10 is utilized in the NP solution 12. In other embodiments, more than one type of NP 10 is used in the NP solution 12. In some embodiments, NPs 10 of more than one size (radius, $R_{NP}$) are used in the NP solution 12. In some embodiments, the NPs 10 are the same size (radius, $R_{NP}$). In other embodiments, NPs 10 of different shapes are used in NP solution 12. In some embodiments, the NPs 10 have no coating ligand. In other embodiments, the NPs 10 have more than one coating ligand. In some embodiment, the NPs 10 have one coating ligand.

Solvents 14 may comprise liquids which are compatible with the NPs 10 and any ligand on their surface. Solvents 14 may also be selected based on their ability to spread on a top surface 28 of the sub-phase solution 16, their viscosities, their effect on the charge or agglomeration of the NPs 10, and their rate of evaporation. Examples of solvents 14 include ethanol, acetone, isopropanol, hexane, chloroform, toluene, cyclopentanone, dichloromethane, and n-methyl-2-pyrrolidone. In one embodiment, the solvent 14 may be toluene.

The concentration of NPs ($C_{NP}$) 8 in the solvent 14 and the volume of nanoparticle solution ($V_{soln}$) 22 used to form a NP film are parameters that influence the uniformity and organization of the NP film through NP solution spreading. Methods of determining an ideal $C_{NP}$ 8 and $V_{soln}$ 22 are described below. In general, $C_{NP}$ 8 may be calculated for a given $V_{soln}$ 22 as the number of NPs 10 needed to form a monolayer film when spread across a predetermined area, per that $V_{soln}$ 22 which spreads across the predetermined area.

Figure 2:
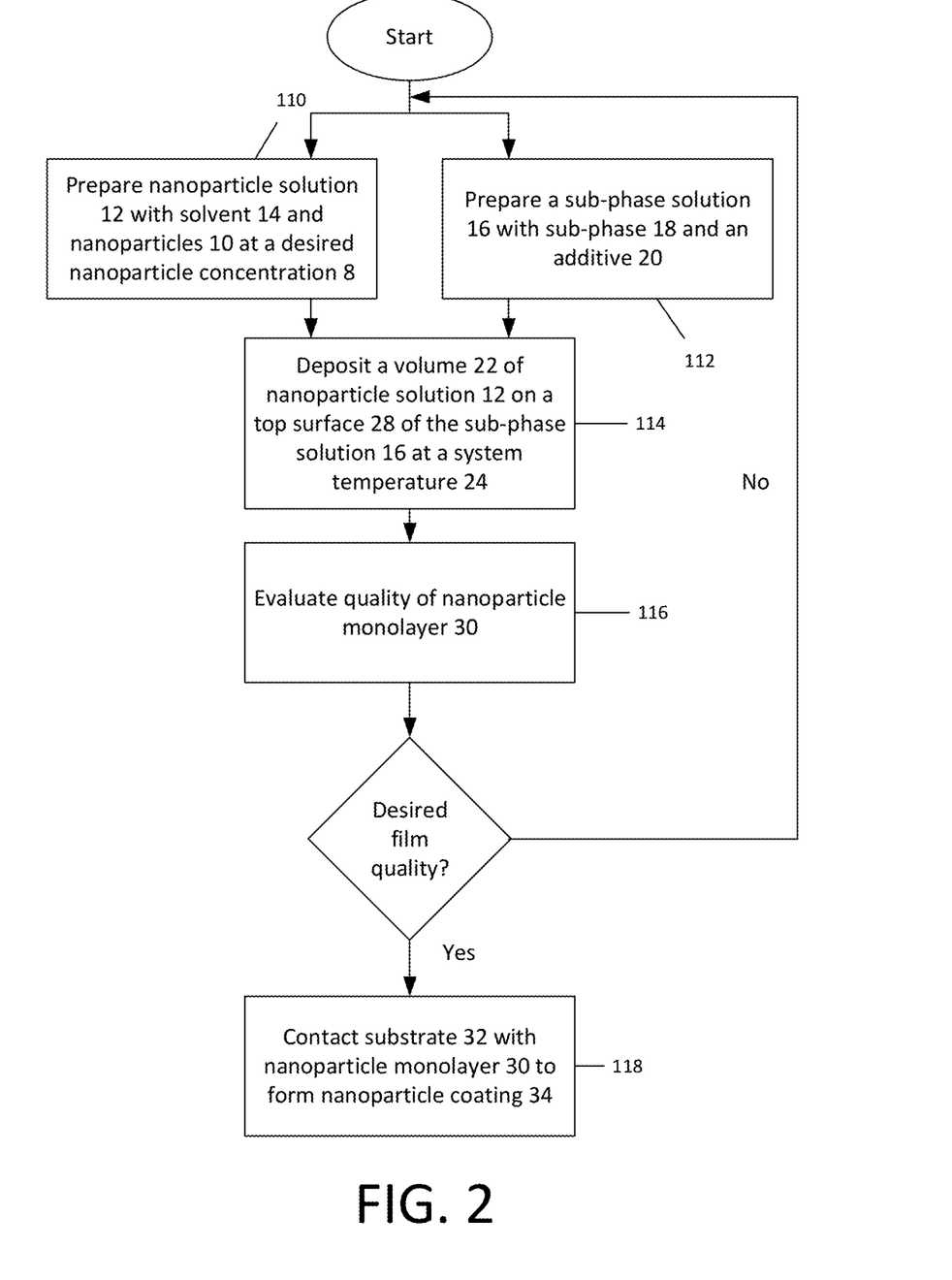
FIG. 2 is a flowchart demonstrating an exemplary method for creating monolayer Langmuir films of NPs following the process depicted in FIG. 1.

As shown in FIG. 1 and described in the method in FIG. 2, a $V_{soln}$ 22 with a concentration $C_{NP}$ 8 is deposited on the top surface 28 of a sub-phase solution 16. The sub-phase solution 16 may be any solution that is compatible with the solvent 14 and NP solution 12 and that allows the $V_{soln}$ 22 to float on its top surface 28 as a NP film. In some embodiments, the sub-phase solution 16 includes a sub-phase base 18 and an additive 20. In other embodiments, the sub-phase solution 16 includes only the sub-phase base 18. In some instances, the sub-phase base 18 is water, which may be deionized and distilled. However, other sub-phase bases 18 are compatible with the present disclosure such that they are compatible with the NP solution 12 and allow any additive or additives 20 to remain suspended as a sub-phase solution 16. Additive 20 is chosen based on the overall desired sub-phase solution properties for the system. In some embodiments, the additive 20 is glycerol, though other additives 20 are compatible with the present disclosure. Additive 20 is present in the sub-phase solution 16 as a percent weight, which ranges from 0% to 100%. In some instances, glycerol is used as an additive in a water sub-phase base at 0 to 100 percent weight, or at about 20 to 100 percent weight. The change in NP solution spreading rate is directly proportional to the change in interfacial tension between the spreading solvent 14 and sub-phase solution 16, and inversely proportional to the change in sub-phase solution viscosity and density. A variety of solvents 14, sub-phase bases 18, and sub-phase additives 20 can be used to achieve the desired spreading rate for a given NP system.

The concentration of the additive 20 is varied to change the sub-phase solution properties and solvent spreading rate. Using glycerol, the spreading rate of the NP solution 12 mixture decreases as the weight percent of glycerol is increased. This is due to the glycerol additive increasing the sub-phase solution viscosity and density, and decreasing the interfacial tension between the sub-phase solution 16 and the solvent 14. As the spreading rate decreases, fewer, if any, defects in the Langmuir film are formed and the NP dispersion uniformity increases, resulting in a NP monolayer 30. Fluorescent digital imaging may be used to capture film images as spreading stops and solvent evaporation is complete, as described in greater detail below. The spreading rate of a NP solution 12 for different sub-phase solutions 16 is quantified in some instances by measuring the maximum film radius, $r_{max}$, of the resulting NP monolayer 30 and dividing $r_{max}$ by the time required to reach $r_{max}$. The uniformity of the NP monolayers 30 is quantified in some instances by analyzing fluorescence intensity in images of films of fluorescent NPs. Intensity analysis is undertaken using commercially available software, such as ImageJ and code written in IgorPro.

As detailed in FIG. 2, the present method involves first preparing the NP solution 12 in step 110 and the sub-phase solution 16 in step 112. Both solutions may include components as described above. The sub-phase solution 16 is contained within a vessel 26 and at a sub-phase system temperature 24. In one embodiment of the disclosure, sub-phase temperature 24 is approximately 5° C. to approximately 75° C. or any temperature such that a NP monolayer 30 may be formed on the top surface 28 of the sub-phase solution 16. In one embodiment, sub-phase temperature 24 may be room temperature. The temperature 24 is controlled in some instances to change the spreading rate of the NP solution 12. As such, a higher sub-phase temperature 24 results in more rapid evaporation of solvent 14 from the NP solution 12 and a lower spreading rate. Conversely, a lower sub-phase temperature 24 results in slower solvent evaporation and a faster spreading rate of the NP solution 12. The vessel 26 is a size that allows top surface 28 to have a surface area greater than the intended area of a resulting NP monolayer 30. Thus, vessel 26 is compatible with an unconstrained spreading of NP solution 12.

In FIG. 2, step 114, $V_{soln}$ 22 is deposited on the top surface 28 of the sub-phase solution 16. The $V_{soln}$ 22 may be deposited on the top surface 28 of the sub-phase solution 16 using a dropper, a pipette, a syringe, or any other suitable liquid dropping means. The deposition of $V_{soln}$ 22 may be undertaken by contacting the $V_{soln}$ 22 directly with the top surface 28 of the sub-phase solution 16 using a touch method or by dropping $V_{soln}$ 22 from a height above the top surface 28. In one embodiment, $V_{soln}$ 22 is deposited by the touch method and in another by the drop or fall method. The deposition takes place in a manner that allows the $V_{soln}$ 22 to spread unconstrained across the sub-phase solution 16 so that the area of the top surface 28, as encountered by the NP solution 12, is effectively infinity.

Now referring to step 116 of FIG. 2, the quality of the NP monolayer 30 is evaluated. This evaluation probes the uniformity and heterogeneity of the NP monolayer 30, both at a macro and nano-scale. Heterogeneous or non-uniform features, such as agglomerates, discontinuities, "coffee ring" patterns, islands, or heterogeneous film thickness are considered non-ideal. Thus, films displaying such non-uniform features are not used and are instead re-formed using altered spreading conditions, as is described in greater detail below. The evaluation of the NP monolayers 30 is undertaken by evaluating radioprofiles of the films. In some embodiments, NPs 10 in the films include fluorescent labels or are fluorescent, such that a NP monolayer 30 may be evaluated using fluorescent microscopy. In such cases, fluorescence intensity images of films are taken and intensities are evaluated for uniformity. A perfectly uniform film has a constant intensity across all dimensions of the film. Normalized radial probability distribution plots of fluorescence intensity versus radius of the NP monolayer 30 are viable as representations of the average area density distributions of QDs or NPs 10 in a Langmuir film. The area number density distribution of NPs 10 in Langmuir films can be compared quantitatively within any one film by the quantitative ratio of normalized intensity density. The above is also true for comparisons on Langmuir films deposited with the same total number of NPs 10 regardless of any other conditions at deposition. The quantitative measure of NP distribution for each NP monolayer 30 may be determined by evaluating plots of the average radial intensity at $r_{max}$.

When NP monolayer uniformity is not ideal in step 116 of FIG. 2, some or all of steps 110-116 are repeated with altered parameters in order to change the spreading rate of the NP solution 12. In some instances, more or less NPs 10 are included in solvent 14 to result in a different $G_{np}$ or $C_{QD}$ 8. An increase in this concentration results in more binding forces felt between NPs 10. Though not to be beholden to any one theory, it is believed that the force that pulls the NPs 10 together may comprise the attractive forces between the NPs 10 and may be influenced by the presence of ligands on the NPs 10 and the $C_{np}$ 8. Capillary forces may serve to draw the NPs 10 together as the solvent 14 evaporates. The evaporation rate of the solvent 14 that drives the capillary forces may be adjusted by controlling parameters including the sub-phase temperature 24, ambient temperature, humidity, pressure, and other environmental factors. Evaporation of the solvent 14 may be controlled using structures or containers such as an incubator or other suitable humidity and/or temperature controlling containers. Additionally, the amount and type of solvent 14 used may be changed to increase or decrease evaporation rates, with faster solvent evaporation resulting in lower spreading rates of the NP solution 12.

With regard to sub-phase solution parameters, the addition or alteration of additives 20 influences spreading rates on the sub-phase solution 16. The interfacial tensions of liquids 14 and 16 as well as the viscosity and density of sub-phase solution 16 influence spreading behavior. A more dense and viscous sub-phase solution 16 with greater additive content or more dense and viscous types of additives 20 slows the spreading rate of NP solution 12. It is believed that the suppression of the spreading forces allows a balance with evaporation-led capillary forces and intra-particle attractive forces and that a uniform NP monolayer 30 may be "locked" as the film stabilizes and the solvent 14 evaporates. The spreading does not involve constraining boundaries or post-compression of the NP Langmuir film and, because the assembly and organization of NPs 10 are driven by a balance of non-external forces, the assembly is considered to be spontaneous.

When the NP monolayer 30 is considered uniform upon evaluation in step 116 of FIG. 2, a substrate 32 is placed in contact with the NP monolayer 30 to form a NP coating 34 on the substrate 32, as shown in FIG. 1 and described in step 118 of FIG. 2. The substrate 32 may be any material suitable for coating with a NP coating 34 and may be of any size and shape compatible with the dimensions of the sub-phase vessel 26 and the NP monolayer surface area. The vessel 26 containing the NP monolayer 30 may be selected to accommodate the dimensions of an intended substrate 32. The coated substrate 36 may be produced using LB or LS techniques, as is known in the art. In the case of LB methods, the substrate 32 is immersed in the sub-phase solution 16 in an orientation where the smallest dimension of the substrate 32 is parallel with the top surface 28 of the sub-phase solution 16. After the portion of the substrate to be coated has been immersed in the sub-phase solution 16, it is withdrawn in the same orientation in which it was immersed, allowing a well-ordered coating of NPs to be coated on the substrate 32. In the case of LS methods, the substrate 32 is stamped onto the NP monolayer 30 on the top surface 28 of the sub-phase solution 16, where the substrate 32 is in an orientation where the smallest dimension of the substrate 32 is perpendicular to the top surface 28 of the sub-phase solution 16. The result from both LB and LS methods in conjunction with the disclosed method is a coated substrate 36 with a uniform NP coating 34.

These methods may be used to produce coated substrates 36 with uniform monolayer coatings or may be utilized repeatedly to form coated substrates 36 with well-defined multilayers. The thickness of the coated NP layer or layers may be homogeneous and uniform. The methods may be integrated as a batch process wherein the sub-phase solution 16 is static under a NP solution 12 as it is deposited as a drop, multiple drops, or a stream onto the sub-phase solution 16 and wherein the deposited solution is spread on the sub-phase solution 16. The methods may also be integrated as a continuous process wherein the sub-phase solution 16 flows under the point of deposition of a NP solution 12 while it is deposited as a drop, multiple drops, or a stream onto the sub-phase solution 16 and wherein the deposited solution is 1 spread on the sub-phase solution 16. Either of these methods may be compatible in a production line approach to manufacture and coat substrates at an industrial scale.

The assessment of NP coatings 34 may be undertaken if desired using fluorescence microscopy or other fluorescence imaging techniques. Optical imaging techniques and other macro-scale analysis may be undertaken as suitable. Techniques for micro-scale analysis of NP coatings 34 include scanning electron microscopy, ellipsometry, atomic force microscopy, Brewster angle microscopy, confocal microscopy, and any other technique suitable for analyzing nano- and micro-scale film features.

Example 1

Figure 3:
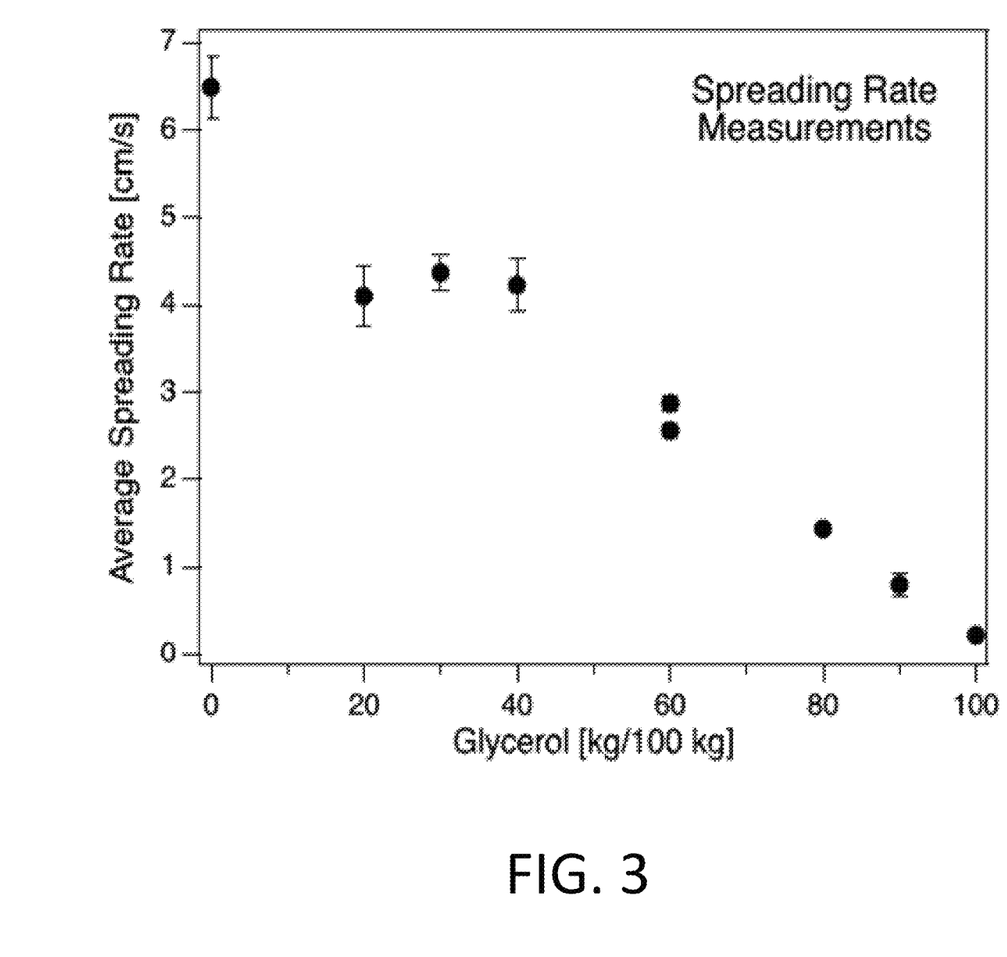
FIG. 3 is a graphical representation of the average spreading rate of a nanoparticle solution across a surface of a sub-phase solution as a function of the percent weight of glycerol in the sub-phase solution, in accordance with the process depicted in FIG. 1. Error bars represent one standard uncertainty from at least two to five experiments.

In FIG. 3, NP solution spreading rates are shown as a function of glycerol content in exemplary systems. QD films were using the Langmuir method. The sub-phase was modified by adding glycerol from 0 to 100 weight percent. FIG. 3 shows that spreading rate decreases as glycerol content increases. The spreading rate flattens between 20 and 40 percent glycerol due to offsetting contributions of interfacial tension, viscosity and density to the system fluid dynamics. Film quality at each weight percent of glycerol was assessed visually by imaging the film at the maximum radius.

Example 2

Figure 4:
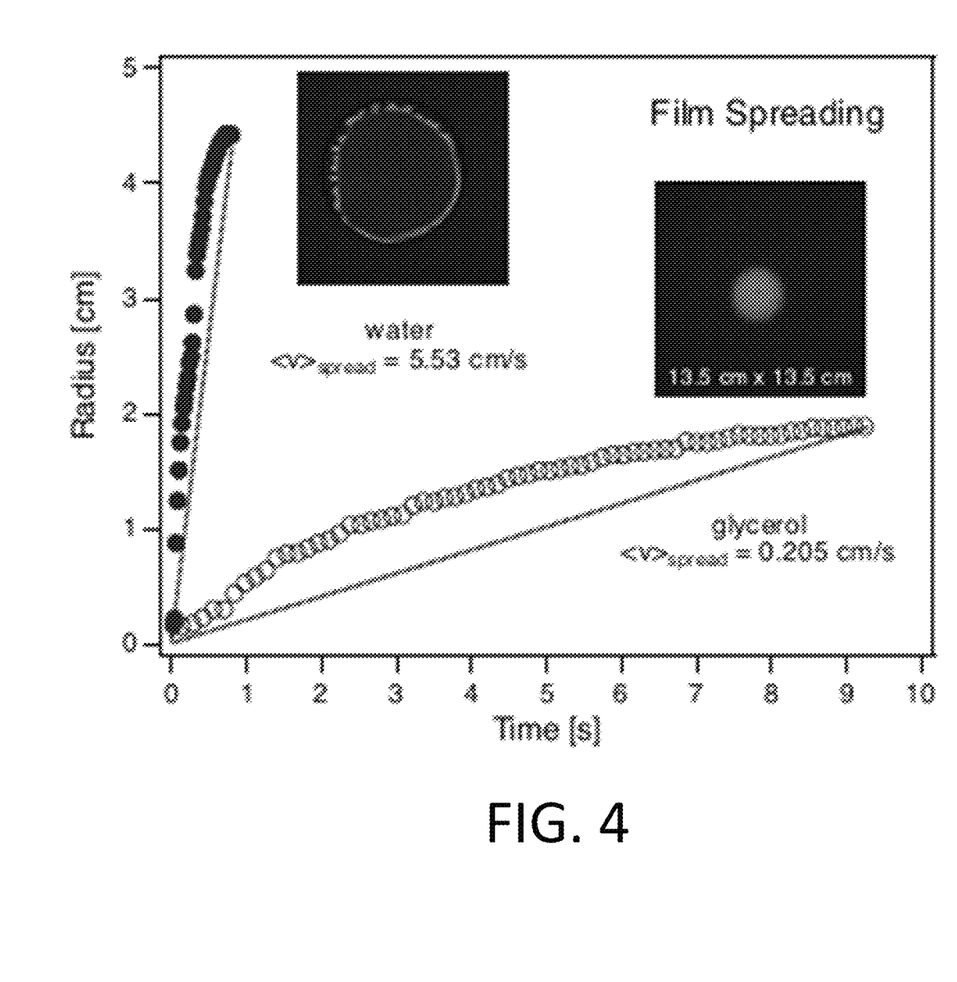
FIG. 4 is a graphical representation of the radius of a nanoparticle film formed from nanoparticle solution spreading across a surface of a sub-phase solution as a function of time, in accordance with the process depicted in FIG. 1. Closed circles represent a water sub-phase solution, while open circles represent a glycerol sub-phase solution. Linear fits for the data for each sub-phase solution are shown as solid lines. The average spreading rate for each sub-phase solution is the radius at the maximum expansion of the nanoparticle film divided by the time to reach the maximum expansion. Inset images show nanoparticle films on water and glycerol sub-phase solutions at a 13.5 cm×13.5 cm scale.

In FIG. 4, film radius versus time is displayed for the expansion of the films of NPs on two different sub-phase liquids, water or glycerol. The inset images show the patterns on water and glycerol in the expanding states in a 13.5 cm×13.5 cm scale. The ring on the image for the pattern on water shows how outer radius is defined. The radius is considered to be clear for the pattern on glycerol. The solid lines show how average spreading rate is defined as the radius at the maximum expansion divided by the time to reach that state.

Example 3

Figure 5:
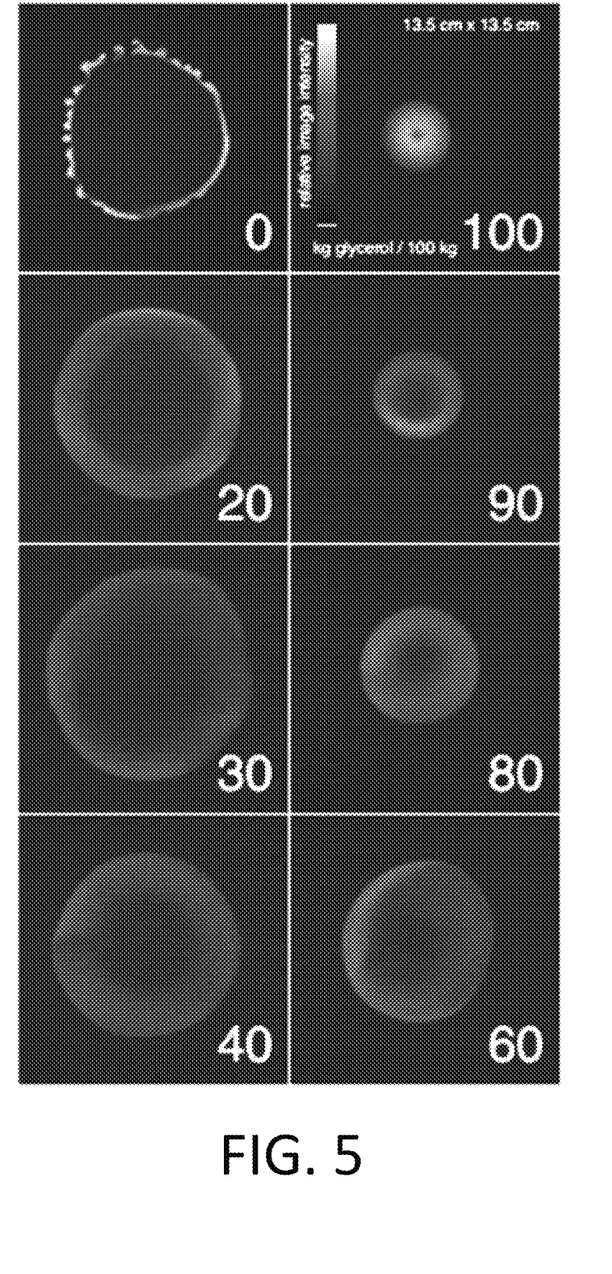
FIG. 5 depicts a series of images showing nanoparticle films formed on sub-phase solutions with various amounts of glycerol by the process depicted in FIG. 1. Glycerol content ranges from 0 percent weight in the top left image to 100 percent weight in the top right image. Each image represents a 13.5 cm×13.5 cm viewing area. The relative intensities of the nanoparticle films are scaled to represent the relative packing density (amount per unit area) of the fluorescent nanoparticles (quantum dots).

In FIG. 5, representative patterns are seen for the films on sub-phase solutions at different compositions of glycerol in water. Each image represents an area 13.5 cm×13.5 cm in size. The relative intensities are scaled in each image to represent relative packing density (amount per unit area) of the fluorescent NPs (quantum dots).

Example 4

Figure 6:
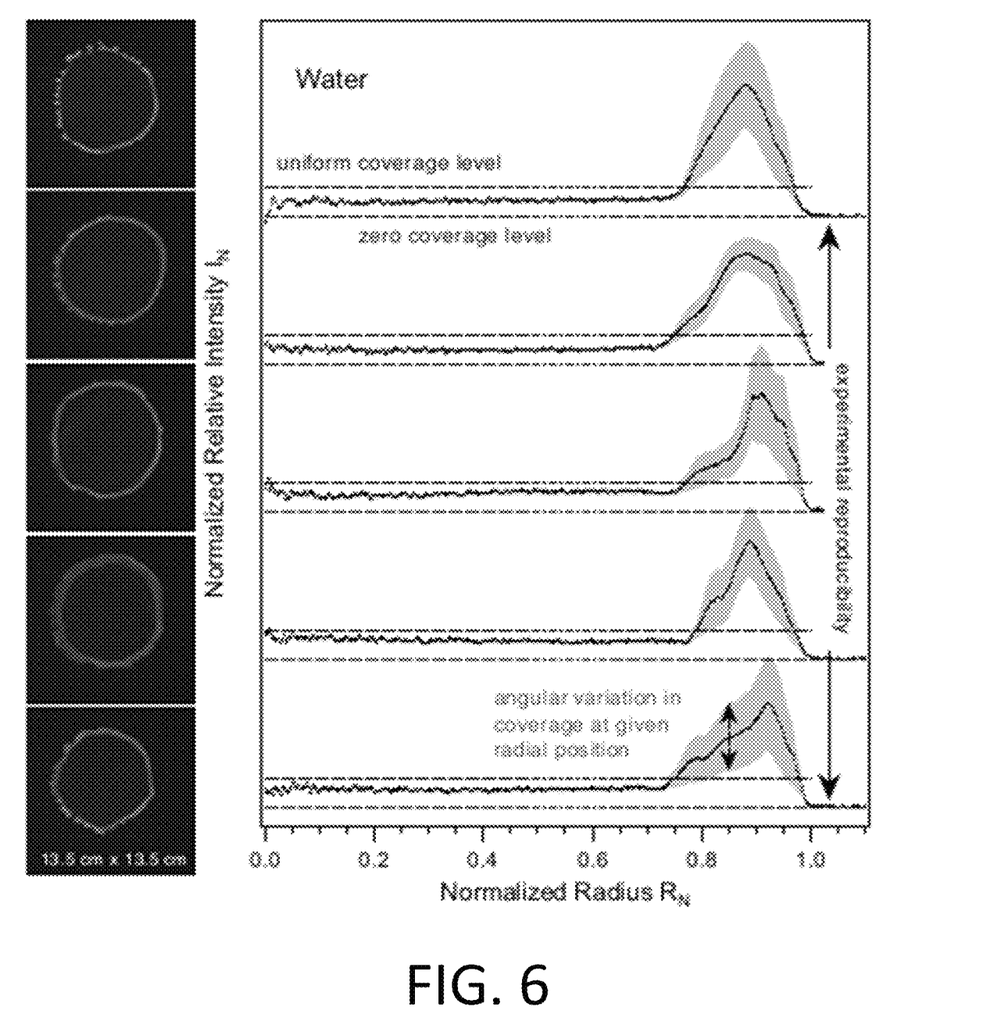
FIG. 6 is a graphical representation and series of images of nanoparticle films formed on a water sub-phase solution by the process depicted in FIG. 1. The graphs display plots of normalized radial intensity for each nanoparticle film versus normalized radial position of the nanoparticle film. Images are displayed with a 13.5 cm×13.5 cm viewing area. Each image and its radial profile is offset to indicate a replicate experiment. Each radial profile is marked with horizontal dashed lines to indicate an intensity of a uniform film coverage level and of a zero film coverage level. Gray shaded areas of the plots are uncertainty ranges for each profile that indicate the variation in coverage density of nanoparticles as a function of angular position for a given radial position.

In FIG. 6, plots of normalized radial intensity versus normalized radial position for image patterns seen for films spreading on a water sub-phase are shown. Images are at 13.5 cm×13.5 cm scale. Each image and its radial profile is offset to indicate a replicate experiment. Each radial profile is marked with horizontal lines to indicate normalized intensity at uniform coverage and at zero coverage. Gray uncertainty ranges on each profile indicate the variation in coverage density of NPs as a function of angular position for a given radial position.

Example 5

Figure 7:
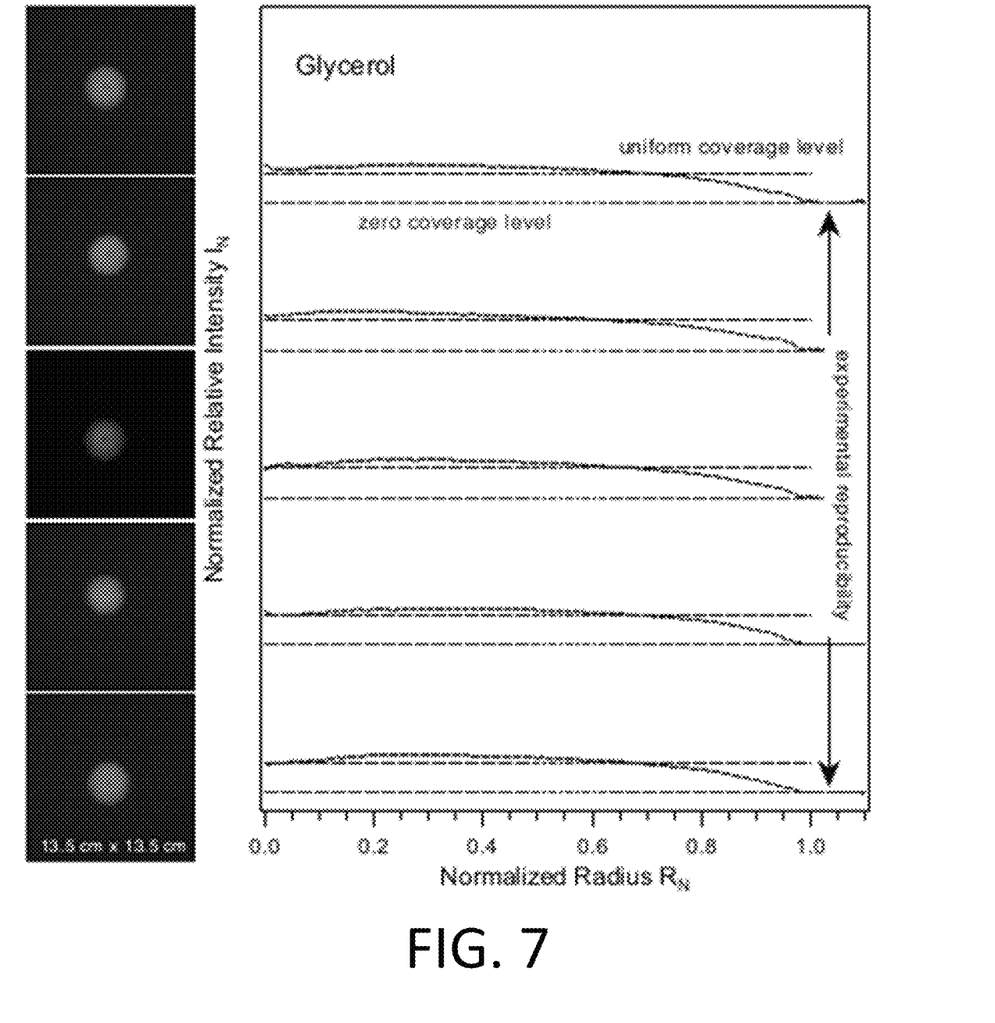
FIG. 7 is a graphical representation and series of images of nanoparticle films formed on a glycerol sub-phase solution by the process depicted in FIG. 1. The graphs display plots of normalized radial intensity for each nanoparticle film versus normalized radial position of the nanoparticle film. Images are displayed with a 13.5 cm×13.5 cm viewing area. Each image and its radial profile is offset to indicate a replicate experiment. Each radial profile is marked with horizontal dashed lines to indicate an intensity of a uniform film coverage level and of a zero film coverage level. Gray shaded areas of the plots are uncertainty ranges for each profile that indicate the variation in coverage density of nanoparticles as a function of angular position for a given radial position.

In FIG. 7, plots of normalized radial intensity versus normalized radial position for image patterns seen for films spreading on a glycerol sub-phase are shown. Images are at 13.5 cm×13.5 cm scale. Each image and its radial profile is offset to indicate a replicate experiment. Each radial profile is marked with horizontal lines to indicate normalized intensity at uniform coverage and at zero coverage. Gray uncertainty ranges on each profile indicate the variation in coverage density of NPs as a function of angular position for a given radial position.

Example 6

Figure 8:
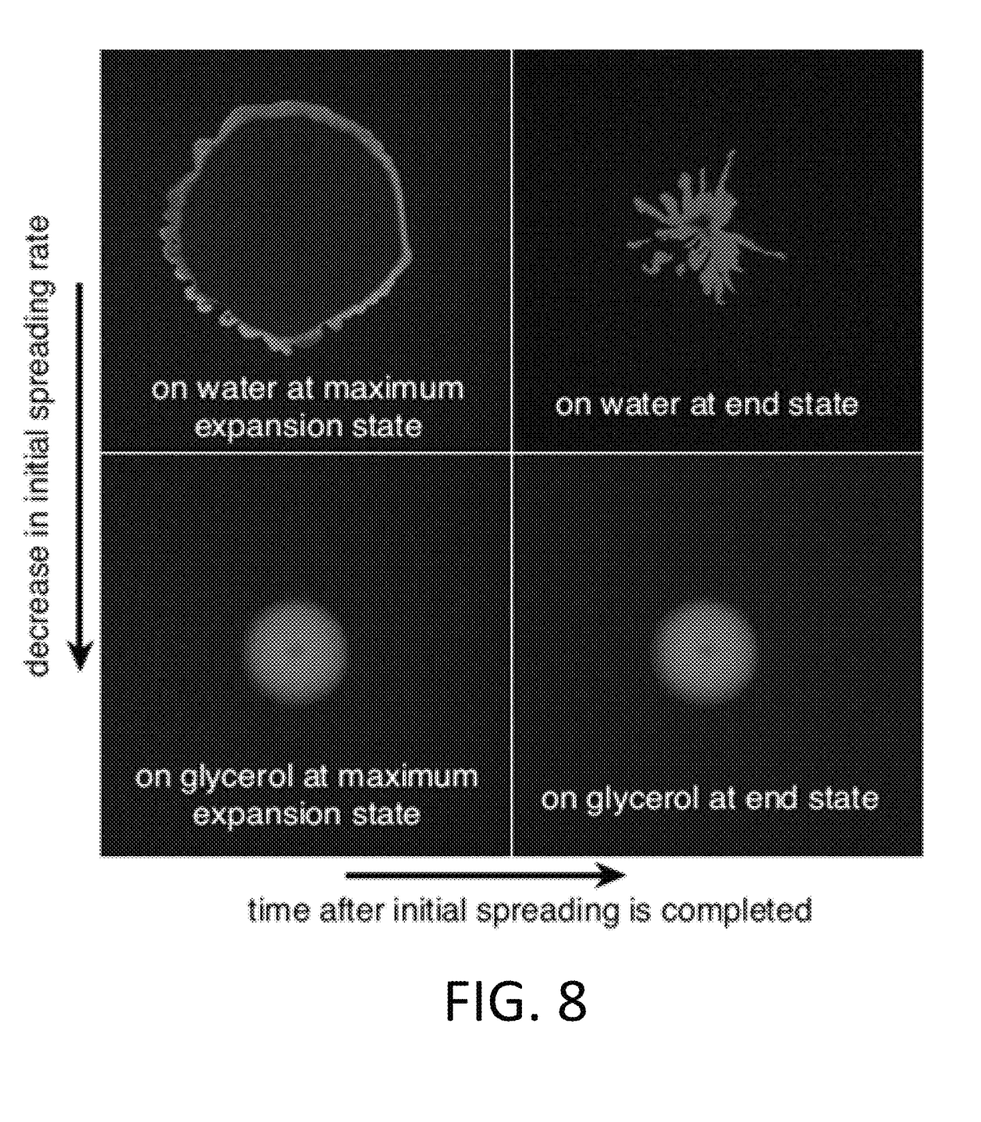
FIG. 8 depicts images of nanoparticle films formed on either water or glycerol sub-phase solutions by the process depicted in FIG. 1. Nanoparticle films at their maximum spreading radius are shown on the left, while nanoparticle films in their final steady state are shown on the right. The sub-phase solution is water for the top images and glycerol for the bottom images. Nanoparticle films spread at high spreading rates on water and low spreading rates on glycerol. All images are shown with a 13.5 cm×13.5 cm viewing area.

In FIG. 8, NP films are seen at high spreading rate (on water) and on the slowest spreading rate (on glycerol) at the maximum diameter and at a final state (steady state) after collapsing. The initial and final patterns are the same for spreading on glycerol. All images are at 13.5 cm×13.5 cm in size.

Example 7

Figure 9:
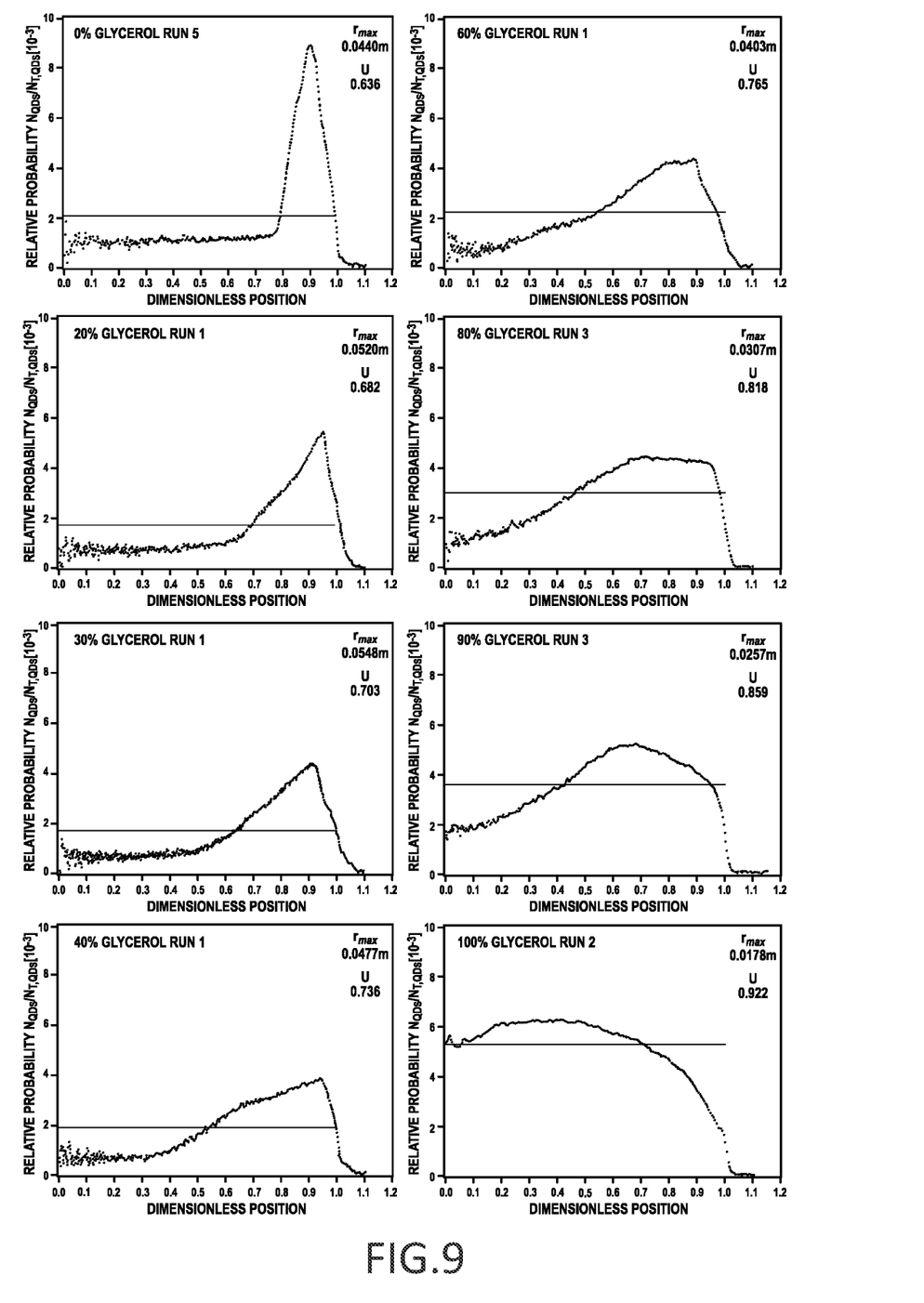
FIG. 9 displays graphical representations of the relative probability of nanoparticle films versus position on sub-phase solutions with various glycerol contents, formed in accordance with the methods depicted in FIG. 1. Glycerol content is indicated by percent weight. Values for the maximum radius, $r_{max}$, and film uniformity, U, of each nanoparticle film are shown at the top right of each plot.

In FIG. 9, the radial intensity profile plots show that the QD distribution progressively moves from a concentration at the edge of the film at the higher spreading rate associated with 0% glycerol to a more uniform distribution as glycerol content is increased to 100% and the spreading rate decreases. This is in agreement with images of the film in FIG. 5. It is believed that the films represent a monolayer of QDs, as can be evaluated with depositions onto solid substrates along with atomic force microscopy. FIG. 9 shows that the NP distribution in a Langmuir film is affected by spreading rate. The faster the spreading rate of the Langmuir film, the more likely that the final film will consist of a coffee ring pattern with Marangoni flow at the outer edges. The quantitative distribution of NPs in a Langmuir film categorically depends on film spreading rate. The same approach may be used to control the distribution of NPs on a solid sub-phase by changing the surface energy of the solid sub-phase through chemical dopants, surface tension modification or roughness.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

We claim:

1. A method preparing a uniform nanoparticle coating on a substrate, comprising the steps of:
   a) providing a nanoparticle solution comprising an initial concentration of nanoparticles in a solvent, the solvent having a solvent vapor pressure and a solvent surface tension;

b) containing a sub-phase solution of a denser, immiscible liquid within a vessel at a sub-phase surface tension, density and viscosity, the vessel contained within a controlled environment;

c) depositing a volume of the nanoparticle solution onto a top surface of the sub-phase solution, the volume of the nanoparticle solution being unconstrained by walls of the vessel, wherein nanoparticle solution spreading at a nanoparticle solution spreading rate and solvent evaporating at a solvent evaporation rate controls the formation of a nanoparticle film;

d) evaluating the nanoparticle film for non-uniform features;

e) repeating steps a)-d) when non-uniform features are observed, such that a ratio of the nanoparticle solution spreading rate to solvent evaporation rate is altered in step c) and the nanoparticles form a uniform nanoparticle monolayer on the sub-phase solution; and f) contacting the substrate with the nanoparticle monolayer such that the substrate is coated with a uniform nanoparticle coating.

2. The method of claim 1, wherein the nanoparticles are quantum dots.

3. The method of claim 1, wherein the sub-phase solution comprises a sub-phase aqueous base and an additive.

4. The method of claim 3, wherein the additive is glycerol.

5. The method of claim 4, wherein glycerol comprises 20 to 100 percent of the sub-phase solution by weight.

6. The method of claim 3, wherein the nanoparticle solution spreading rate is altered in the ratio step e) by changing the percent weight of the additive in the sub-phase solution.

7. The method of claim 1, wherein the nanoparticle solution spreading rate is altered in the ratio in step e) by changing the initial concentration of nanoparticles in the solvent, the sub-phase solution density, the sub-phase solution viscosity, the sub-phase solution surface tension, or solvent surface tension.

8. The method of claim 1, wherein the solvent evaporation rate is altered in step e) by changing the solvent vapor pressure.

9. The method of claim 1, wherein the solvent evaporation rate is altered in the ratio in step e) by changing a temperature or pressure of the controlled environment.

10. The method of claim 1, wherein the non-uniform features include agglomerates, discontinuities, or heterogeneous film thickness.

11. The method of claim 1, wherein the substrate is contacted with the nanoparticle monolayer using a Langmuir Blodgett or Langmuir Schaefer technique.

* * * * *